US006927903B2

(12) United States Patent
Stuckey

(10) Patent No.: US 6,927,903 B2
(45) Date of Patent: Aug. 9, 2005

(54) RAPIDLY CHANGING DICHROIC BEAMSPLITTER

(75) Inventor: Jeffrey A. Stuckey, Jeffersonville, PA (US)

(73) Assignee: Universal Imaging Corporation, Downingtown, PA (US)

( * ) Notice: Subject to any disclaimer, the term of this patent is extended or adjusted under 35 U.S.C. 154(b) by 0 days.

(21) Appl. No.: 10/825,134

(22) Filed: Apr. 16, 2004

(65) Prior Publication Data

US 2004/0196547 A1 Oct. 7, 2004

Related U.S. Application Data

(63) Continuation of application No. 09/988,880, filed on Nov. 19, 2001, now abandoned, and a continuation of application No. PCT/US01/42957, filed on Nov. 16, 2001.
(60) Provisional application No. 60/249,626, filed on Nov. 17, 2000.

(51) Int. Cl.[7] .............................................. G02B 21/00
(52) U.S. Cl. ...................... 359/381; 359/382; 359/383; 359/384
(58) Field of Search ................................. 359/381–384, 359/368–370; 356/318–320, 417; 250/281–283, 458.1, 459.1, 461.1

(56) References Cited

U.S. PATENT DOCUMENTS

| 4,998,284 A | 3/1991 | Bacus et al. |
| 5,355,215 A | 10/1994 | Schroeder et al. |
| 5,548,661 A | 8/1996 | Price et al. |
| 5,656,441 A | 8/1997 | Faller et al. |
| 5,670,113 A | 9/1997 | Akong et al. |
| 5,790,710 A | 8/1998 | Price et al. |
| 5,989,835 A | 11/1999 | Dunlay et al. |

(Continued)

FOREIGN PATENT DOCUMENTS

| GB | 2 355 354 A | 4/2001 |
| GB | 2 360 162 A | 9/2001 |
| WO | WO 93/10259 | 5/1993 |
| WO | WO 98/07022 | 2/1998 |
| WO | WO 99/08233 | 2/1999 |
| WO | WO 00/03246 | 1/2000 |
| WO | WO 00/17624 | 3/2000 |
| WO | WO 00/17643 | 3/2000 |
| WO | WO 00/26408 | 5/2000 |
| WO | WO 00/49540 | 8/2000 |
| WO | WO 00/50872 A3 | 8/2000 |
| WO | WO 00/50872 | 8/2000 |
| WO | WO 00/60356 | 10/2000 |
| WO | WO 00/63679 | 10/2000 |
| WO | WO 00/63679 A3 | 10/2000 |

(Continued)

OTHER PUBLICATIONS

Biological Techniques Fluorescent and Luminescent Probes for Biological Activity, *Multiparameter Imaging of Cellular Function*, Bright, cover sheet and pp. 204–215, 1993.
Chemical Analsis, Fluorescence Imaging Spectroscopy and Microscopy, *Automated Image Microscopy*, Wodnicki, cover page, copyright page, pp. V. 31 and 34–54, 1996.

*Primary Examiner*—Mohammad Sikder
(74) *Attorney, Agent, or Firm*—Oblon, Spivak, McClelland, Maier & Neustadt, P.C.

(57) ABSTRACT

An epi-fluorescent microscope is constructed with a quick changing set of filters. A wheel containing a plurality of dichroic beamsplitter mirrors mounted equidistance from a center axis of the wheel is mounted at a 45° angle within the lightpath and provides a beamsplitter function. Light from an excitation source is provided as monochromatic light, so that light from the excitation source is reflected by a selected one of the dichroic mirrors to the specimen, and Stokes shifted light from the specimen is transmitted through the dichroic mirror. By separately mounting the dichroic mirrors, the dichroic mirrors can be quickly moved and a quicker change of sensed fluorophores is achieved.

21 Claims, 4 Drawing Sheets

U.S. PATENT DOCUMENTS

| | | |
|---|---|---|
| 6,103,479 A | 8/2000 | Taylor |
| 6,345,115 B1 | 2/2002 | Ramm et al. |
| 6,381,058 B2 | 4/2002 | Ramm et al. |
| 6,731,781 B1 * | 5/2004 | Shams et al. ............... 382/129 |
| 2001/0041347 A1 | 11/2001 | Sammak et al. |
| 2002/0002559 A1 | 1/2002 | Busa |
| 2002/0004792 A1 | 1/2002 | Busa |

FOREIGN PATENT DOCUMENTS

| | | |
|---|---|---|
| WO | WO 00/70342 | 11/2000 |
| WO | WO 00/72258 A2 | 11/2000 |
| WO | WO 00/79241 A2 | 12/2000 |
| WO | WO 01/07891 A3 | 2/2001 |
| WO | WO 01/07891 A2 | 2/2001 |
| WO | WO 01/08036 A2 | 2/2001 |
| WO | WO 01/11340 A1 | 2/2001 |
| WO | WO 01/11341 A2 | 2/2001 |
| WO | WO 01/35072 A2 | 5/2001 |
| WO | WO 01/40436 A2 | 6/2001 |
| WO | WO 01/59149 A2 | 8/2001 |
| WO | WO 01/88593 A1 | 11/2001 |

* cited by examiner

RAPIDLY CHANGING DICHROIC BEAMSPLITTER

CROSS REFERENCE TO RELATED APPLICATIONS

This application is a continuation of application Ser. No. 09/988,880 filed Nov. 19, 2001 now abandoned. This application claims the priority from U.S. Provisional Patent Application No. 60/249,626, filed Nov. 17, 2000, and is a continuation International Patent Application PCT/US01/42957 filed Nov. 16, 2001. The entire contents of all three of the aforementioned patent applications are incorporated herein by reference.

BACKGROUND OF THE INVENTION

This invention relates to epi-fluorescent microscopy, and more particularly to the rapid selection of filters for measuring fluorescence at different wavelengths or Stokes shifts.

Current fluorescent microscope designs employ an incident light or epi-fluorescent design where a dichroic beam splitter (or chromatic mirror) mounted in a filter cube at a 45 degree angle to the excitation light path, is used to reflect shorter excitation wavelengths of light onto the specimen while passing longer emission wavelengths to the eyepieces or camera (FIG. 2).

Many fluorescence applications require two or more fluorescent labels to be present in the specimen. Each label has its own excitation and emission spectra, and thus requires different excitation and emission filters, as well as a different dichroic beamsplitter.

To date two approaches to using multiple fluorophores have been employed:

1) Use dichroic beamsplitters that have multiple cutoff wavelengths. Thus a single dichroic can be used with multiple fluorophores. However because of bandwidth restrictions, total light throughput is reduced, thus creating longer exposure times when working with a camera. Longer exposure times translate into longer acquisition duty cycles which is problematic in paradigms into longer acquisition duty cycles which is problematic in paradigms requiring repetitive high-speed data acquisition (screening applications and applications using living cells).

2) Motorized filter cube changers. Several commercially available microscopes employ motorized filter cube changes. These allow the use of single dichroics for each fluorophore. However switching time is slow (1–2 seconds) which creates problems when using multiple fluorophores in paradigms requiring repetitive high-speed data acquisition (screening applications and applications using living cells).

SUMMARY OF INVENTION

Disclosed below is a device for rapidly changing dichroic beamsplitters in epi-fluorescent microscopes. The device is a high speed wheel in which dichroic beamsplitters are mounted. The high speed dichroic changer is mounted in an epi-fluorescent microscope, and the changer is under computer control. Computer software can command the changer to rotate different dichroic beamsplitters into the epifluorescent lightpath so that the appropriate dichroic is in position when a particular fluorophore is imaged. The present invention provides a microscope system in which the device is commanded by the software to change dichroic beamsplitters (FIG. 1).

DETAILED DESCRIPTION

Figure 1:
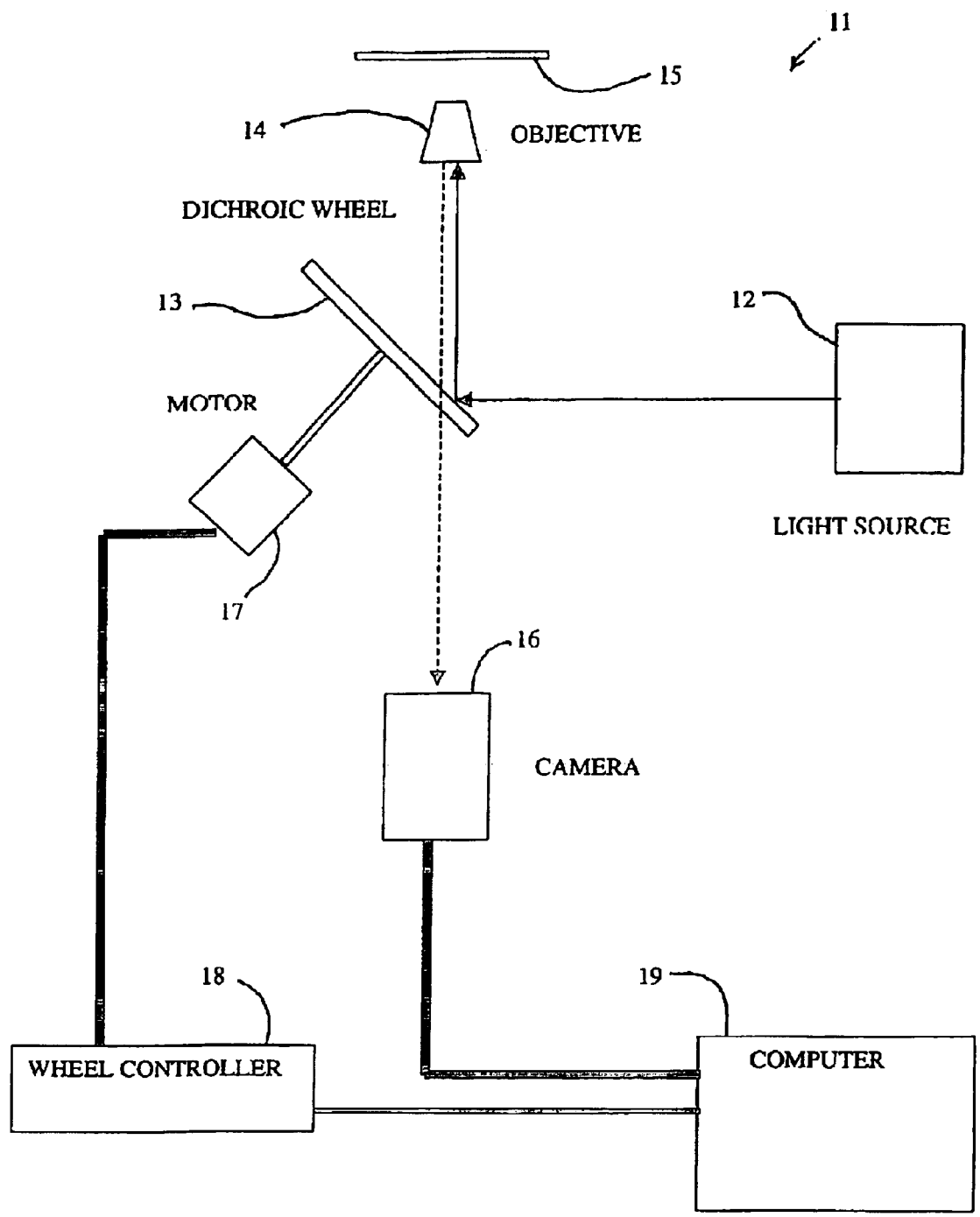
FIG. 1 is a system schematic showing some key components of an analysis microscope constructed according to the present invention.

FIG. 1 is a system schematic showing some key components of an analysis microscope 11 constructed according to one aspect of the invention. The microscope includes a light source 12, a dichroic beamsplitter wheel 13, and an objective 14 which is aligned with a specimen 15, light from the light source 12 is reflected at the dichroic wheel 13, and passes through the objective 14. Light reflected or fluorescing from the specimen 15 again passes through the objective 14, and that light which passes through the dichroic wheel 13 is received by the camera 16. Still referring to FIG. 1, the dichroic wheel 13 is rotationally positioned by a stepper motor 17, which is controlled by motor controller 18. The motor controller 18 is responsive to a computer 19, and the computer 19 also receives images from the camera 16.

Figure 2:
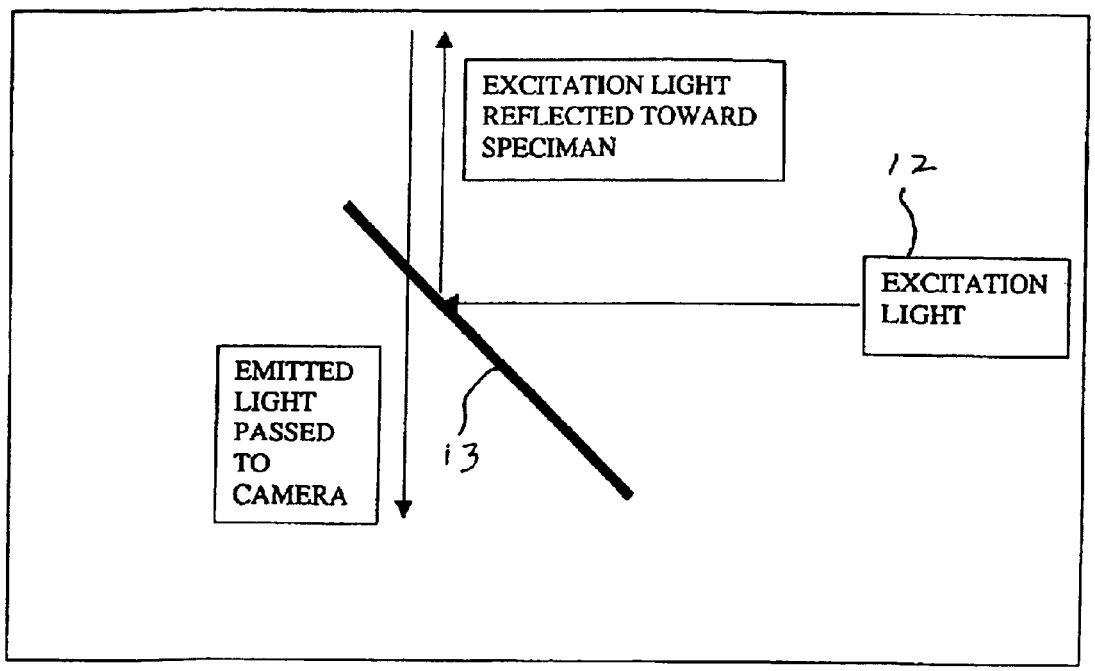
FIG. 2 is a schematic drawing showing epi-fluorescent light paths occurring in the system of FIG. 1.

FIG. 2 is a schematic drawing showing epi-fluorescent light paths. Light from the light source 12 is reflected by the dichroic beamsplitter wheel 13 which is at a reflection angle which determines the lightpath. In the exemplary embodiment, a 45 degree angle is used as the reflection angle, although since standard dichroic cubes with the 45 degree angle are not used, it is likely that other reflection angles can be used. The return light, if it is able to pass the dichroic wheel 13, is received by the camera. This sequence generally corresponds to fluorescent microscope designs which employ a dichroic beam splitter or a chromatic mirror mounted in a filter cube at a 45 degree angle to the excitation light path. Significantly the filter cube is not required.

Figure 3:
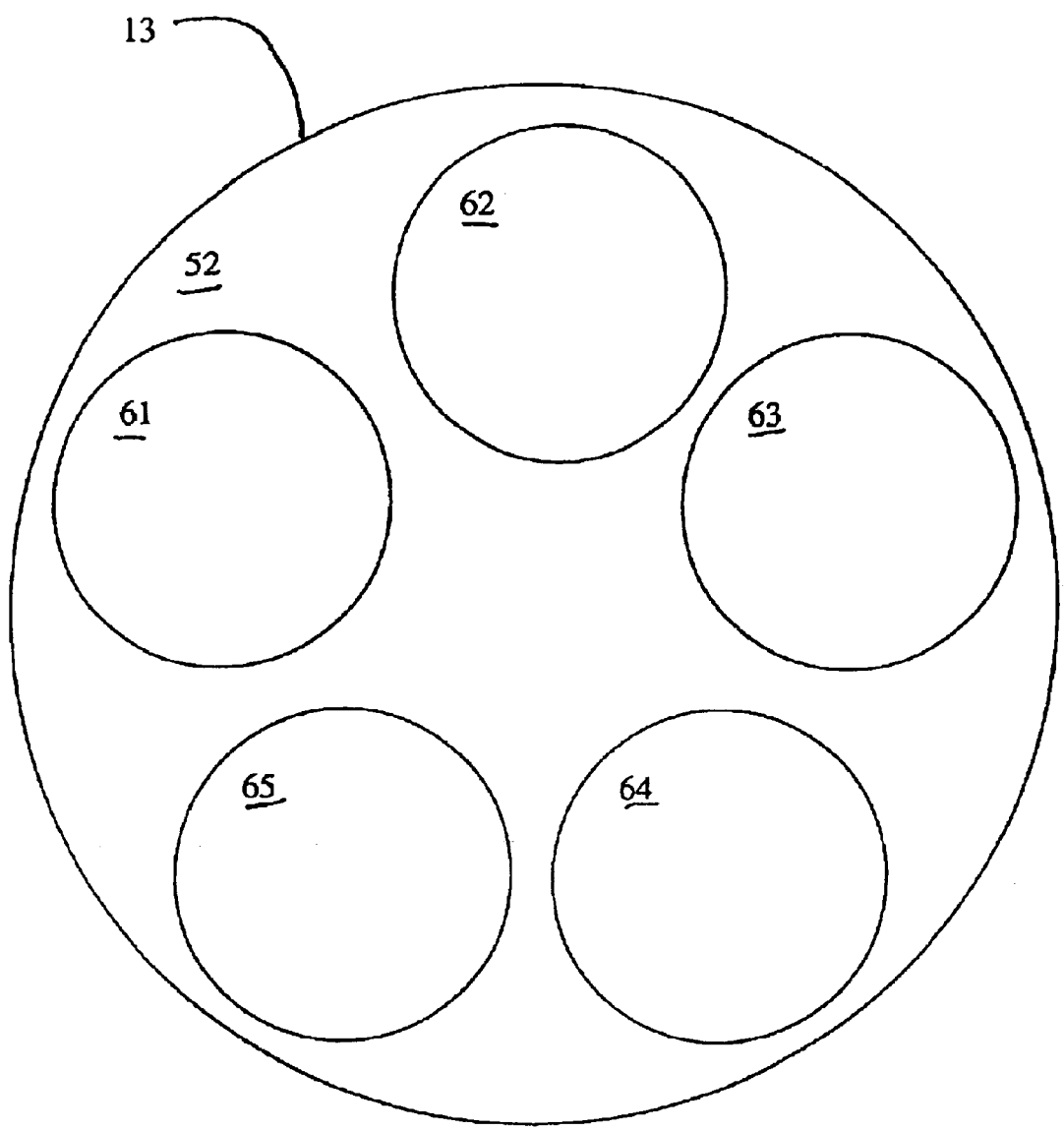
FIG. 3 is a top view showing the arrangement of a high speed dichroic beamsplitter wheel constructed according the present invention.

FIG. 3 is a top view showing the arrangement of a high speed dichroic beamsplitter wheel 13 constructed according to one embodiment of the invention. The wheel 13 includes a support plate 52, on which a plurality of dichroic beamsplitter lenses 61–65 are arranged about a center axis 66 of the support plate 52. Each of the lenses 61–65 have distinct filtering properties. In many cases, only two lenses are required, so it is possible to use plano lenses in the remaining three spots, or to leave the remaining three spots empty.

The solution described here is to mount round 50 mm dichroic beamsplitters in a high-speed filter wheel (FIG. 3). Any size or shape dichroic beamsplitter that matched the optical path of the microscope or instrument would be acceptable.

The wheel is capable of switching between adjacent dichroics in 50 msec. The wheel in the current implementation is driven by a DC stepper motor and is under computer control. Switching time is a function of wheel mass and motor speed. Any motor-wheel combination that allowed faster switching times would be acceptable. It is also conceivable that a galvanometer could drive a wheel at much higher speeds, or that a galvanometer could also move dichroic beamsplitters mounted on a spindle.

Figure 4:
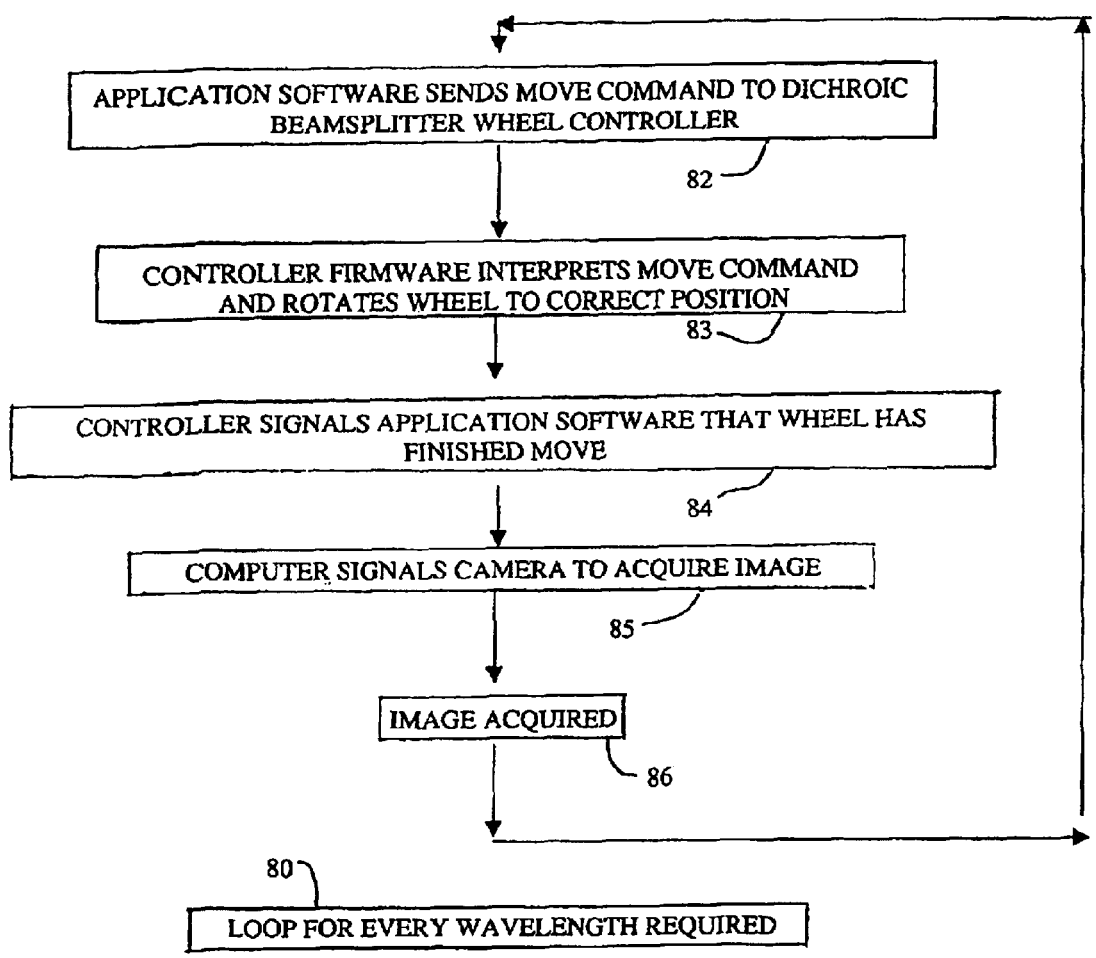
FIG. 4 is a schematic drawing showing control of a microscope according to one aspect of the invention.

The wheel is mounted at a 45 degree angle inside the microscope such that when a given dichroic is selected the opening holding that dichroic is rotated into the epifluorescent light path, and the selected dichroic beamsplitter is at 45 degree angle to the excitation light (FIG. 1, FIG. 4).

This design this allows optimized throughput for each fluorophore while at the same time being able to switch the dichroics rapidly. Optimized throughput is advantageous as it allows for shorter camera exposure times, which decreases duty cycle as well as helps reduce photobleaching. Being able to rapidly switch the dichroic beamsplitter reduces the interval between image acquisitions, thus reducing duty cycle.

FIG. 4 is a schematic drawing showing control for a microscope using a fast dichroic beamsplitter changer according to one aspect of the invention. The figure depicts a loop 80, which represents one complete duty cycle with respect to a predetermined wavelength. Application software sends a move command 82 to a dichroic beamsplitter wheel controller such as controller 18 in FIG. 1. The controller firmware then interprets 83 the move command and rotates 83 the wheel (13, FIG. 1) to a correct position. The controller 18 then signals 84 application software that wheel 13 has finished moving. In response, the computer (19, FIG. 1) signals 85 the camera (16, FIG. 1) to acquire 86 an image. The image is then acquired 87.

This sequence repeated by executing a loop 80 for every wavelength required.

What is claimed is:

1. A microscope for observing a fluorescent specimen having a plurality of fluorophores comprising:
    an epifluorescent microscope having optics and an optical pathway;
    a source of excitation light;
    a high speed wheel driven by a wheel controller, the wheel having a center axis bisecting a predetermined reflection angle within an epifluorescent optical pathway of the microscope optics and being mounted for rotation about the center axis;
    a plurality of dichroic beamsplitters mounted to the wheel; and
    a computer control, the wheel controller being responsive to the computer control, wherein the computer control is programed to command the high speed wheel to rotate different ones of the plurality of dichroic beamsplitters into the fluorescent optical pathway thereby positioning each of a selected plurality of the dichroic beamsplitters in the optical pathway to image each of a selected plurality of particular fluorophores in the specimen.

2. A microscope as in claim 1 further comprising:
    an excitation filter placed between the illumination source and the dichroic beamsplitter, the excitation filter transmitting at least one selected wavelength of light from the illumination source; and
    an emission filter placed in the optical pathway such that light transmitted through the dichroic beamsplitter passes through the emission filter, light from the illumination source passing to the specimen under observation without passing the emission filter, the emission filter transmitting at least one selectable wavelength of light, at least one of the separate excitation filters and emission filters being selectable to change filter wavelength parameters, thereby providing selection of a particular dichroic beamsplitter and at least one of the excitation and emission filters, wherein changing of the filters may be simultaneously executed, except in cases where it is desired to retain the same dichroic beamsplitter while changing one of the excitation and emission filters.

3. A microscope as in claim 1, wherein
    the wheel controller comprises a DC stepper motor.

4. A microscope as in claim 1, wherein
    the wheel controller comprises a galvanometer.

5. A microscope as in claim 1, wherein filters comprising a first set are used as excitation filters and filters comprising a second set are used as emission filters, said excitation filters and said emission filters being provided as notch filters which cooperate with respectively selected dichroic beamsplitters in order to selectively image a particular fluorescent source.

6. A microscope as in claim 1, further comprising:
    an excitation filter placed between the illumination source and the dichroic beamsplitter, the excitation filter transmitting at least one selected wavelength of light from the illumination source; and
    an emission filter placed in the optical pathway such that light transmitted through the dichroic beamsplitter passes through the emission filter, light from the illumination source passing to the specimen under observation without passing the emission filter, the emission filter transmitting at least one selectable wavelength of light, at least one of the separate excitation filters and emission filters being selectable to change filter wavelength parameters, thereby providing selection of a particular dichroic beamsplitter and at least one of the excitation and emission filters, wherein changing of the filters may be simultaneously executed, except in cases where it is desired to retain the same dichroic beamsplitter while changing one of the excitation and emission filters.

7. A microscope as in claim 6, wherein
    the wheel controller comprises a DC stepper motor.

8. A microscope as in claim 6, wherein
    the wheel controller comprises a galvanometer.

9. A microscope as in claim 6, wherein:
    a dichroic beamsplitter is provided as a multiple cut-off beamsplitter; and
    the computer control permits selectively changing the dichroic beamsplitters and excitation filter.

10. A microscope for observing a fluorescent specimen comprising:
    an illumination source;
    microscope optics in an optical pathway for generating a magnified image of a specimen comprising one or more fluorescent materials;
    a beamsplitter changer comprising a plurality of dichroic beamsplitters arranged about a center axis parallel to a line bisecting a predetermined reflection angle to the optical pathway and mounted for rotation about the center axis to allow positioning a selected one of the dichroic beamsplitters in the optical pathway, said optical pathway resulting in reflection of light from the illumination source to the specimen, and transmitting light received through the microscope optics from the specimen, wherein, when the selected dichroic beamsplitter corresponds to a particular fluorescent material under observation, the dichroic beamsplitter reflects illumination light at an excitation wavelength corresponding to the fluorescent material under observation and the dichroic element transmits light shifted in wavelength by a Stokes shift of the fluorescent material under observation;
    at least one color-limiting filter within the optical pathway, the color-limiting filter including a mechanism for changing an admitted wavelength independently of the positioning of the selected ones of the dichroic beamsplitter elements;

a motor and motor controller for rapidly effecting the positioning of the dichroic beamsplitters by rotating the beamsplitter changer about the center axis; and a computer control, the motor controller being responsive to the computer control, wherein the computer control is programmed to command the motor controller to cause the motor to rotate different ones of the plurality of dichroic beamsplitters into the fluorescent optical pathway, thereby positioning each of a selected plurality of the dichroic beamsplitters in the optical pathway to image a each of a selected plurality of particular fluorophores in the specimen.

11. A microscope as in claim 10, wherein:

a dichroic beamsplitter is provided as a multiple cut-off beamsplitter; and the computer control permits selectively changing the dichroic beamsplitters and excitation filter.

12. A microscope as in claim 10, wherein the color-limiting filter includes filters comprising a first set that are used as excitation filters and filters comprising a second set that are used as emission filters, said excitation filters and said emission filters being provided as notch filters which cooperate with respectively selected dichroic beamsplitters in order to selectively image a particular fluorescent source.

13. A microscope as in claim 10, wherein:

a dichroic beamsplitter is provided as a multiple cut-off beamsplitter; and the computer control permits selectively changing the dichroic beamsplitters and excitation filter.

14. A microscope as in claim 10, further comprising:

an excitation filter placed between the illumination source and the dichroic beamsplitter, the excitation filter transmitting at least one selected wavelength of light from the illumination source; and an emission filter placed in the optical pathway such that light transmitted through the dichroic beamsplitter passes through the emission filter, light from the illumination source passing to the specimen under observation without passing the emission filter, the emission filter transmitting at least one selectable wavelength of light, at least one of the separate excitation filters and emission filters being selectable to change filter wavelength parameters, thereby providing selection of a particular dichroic beamsplitter and at least one of the excitation and emission filters, wherein changing of the filters may be simultaneously executed, except in cases where it is desired to retain the same dichroic beamsplitter while changing one of the excitation and emission filters.

15. A microscope as in claim 14, wherein filters comprising a first set are used as excitation filters and filters comprising a second set are used as emission filters, said excitation filters and said emission filters being provided as notch filters which cooperate with respectively selected dichroic beamsplitters in order to selectively image a particular fluorescent source.

16. A microscope as in claim 10, wherein the wheel controller comprises a DC stepper motor.

17. A microscope as in claim 16, wherein filters comprising a first set are used as excitation filters and filters comprising a second set are used as emission filters, said excitation filters and said emission filters being provided as notch filters which cooperate with respectively selected dichroic beamsplitters in order to selectively image a particular fluorescent source.

18. A microscope as in claim 10, wherein the wheel controller comprises a galvanometer.

19. A microscope as in claim 18, wherein filters comprising a first set are used as excitation filters and filters comprising a second set are used as emission filters, said excitation filters and said emission filters being provided as notch filters which cooperate with respectively selected dichroic beamsplitters in order to selectively image a particular fluorescent source.

20. A microscope as in claim 10, wherein:

the motor for rapidly effecting the positioning of the dichroic beamsplitters is a DC stepper motor under computer control;

filters comprising a first set are used as excitation filters and filters comprising a second set are used as emission filters, said excitation filters and said emission filters being provided as notch filters which cooperate with respectively selected dichroic beamsplitters in order to selectively image a particular fluorescent source; and the filters comprising the first set and the filters comprising the second set are each positioned in the optical pathway by a motor and a motor controller under computer control.

21. A microscope as in claim 10, wherein:

the motor for rapidly effecting the positioning of the dichroic beamsplitters is a galvanometer under computer control;

filters comprising a first set are used as excitation filters and filters comprising a second set are used as emission filters, said excitation filters and said emission filters being provided as notch filters which cooperate with respectively selected dichroic beamsplitters in order to selectively image a particular fluorescent source; and the filters comprising the first set and the filters comprising the second set are each positioned in the optical pathway by a motor and a motor controller under computer control.

* * * * *